(12) United States Patent
Zhang et al.

(10) Patent No.: US 11,238,099 B2
(45) Date of Patent: Feb. 1, 2022

(54) METHOD AND DEVICE FOR OBTAINING ANSWER, AND COMPUTER DEVICE

(71) Applicant: BEIJING BAIDU NETCOM SCIENCE AND TECHNOLOGY CO., LTD., Beijing (CN)

(72) Inventors: Jingjing Zhang, Beijing (CN); Ke Sun, Beijing (CN); Ju Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 732 days.

(21) Appl. No.: 16/116,825

(22) Filed: Aug. 29, 2018

(65) Prior Publication Data

US 2019/0065624 A1 Feb. 28, 2019

(30) Foreign Application Priority Data

Aug. 31, 2017 (CN) .......................... 201710773579.9

(51) Int. Cl.
  *G06F 16/00* (2019.01)
  *G06F 16/9032* (2019.01)
  (Continued)

(52) U.S. Cl.
  CPC .... *G06F 16/90332* (2019.01); *G06F 16/3329* (2019.01); *G06F 16/9038* (2019.01); *G06K 9/6201* (2013.01); *G06Q 30/02* (2013.01)

(58) Field of Classification Search
  None
  See application file for complete search history.

(56) References Cited

U.S. PATENT DOCUMENTS

| 7,702,620 B2 | 4/2010 | He et al. |
| 8,200,663 B2 | 6/2012 | Jones et al. |

(Continued)

FOREIGN PATENT DOCUMENTS

| CN | 105068661 A | 11/2015 |
| CN | 106649768 A | 5/2017 |
| CN | 106649786 A | 5/2017 |

OTHER PUBLICATIONS

Chinese Patent Application No. 201710773579.9, Office Action dated Dec. 31, 2019, 7 pages.

(Continued)

*Primary Examiner* — Debbie M Le
(74) *Attorney, Agent, or Firm* — Lathrop GPM LLP

(57) ABSTRACT

The present disclosure provides a method and a device for obtaining an answer, and a computer device. The method includes: receiving a question entered by a user; obtaining one or more first key information points in the question entered by the user according one or more preset word slots; asking the user about core question points through dialogue according to the one or more first key information points; obtaining answers entered by the user for the core question points; obtaining one or more second key information points in the answers entered by the user according to the one or more preset word slots; performing a retrieving in a question and answer library according to the one or more first key information points and the one or more second key information points to obtain an answer to the question entered by the user; and presenting the answer obtained to the user.

12 Claims, 6 Drawing Sheets

(51) Int. Cl.
*G06K 9/62* (2006.01)
*G06F 16/9038* (2019.01)
*G06Q 30/02* (2012.01)
*G06F 16/332* (2019.01)

(56) References Cited

U.S. PATENT DOCUMENTS

| | | | | |
|---|---|---|---|---|
| 9,361,386 B2 * | 6/2016 | Cook | ................ | G06F 16/24575 |
| 9,946,968 B2 * | 4/2018 | Alupului | ................ | G06N 20/00 |
| 10,521,463 B2 * | 12/2019 | Byron | ................... | G06F 16/338 |
| 2019/0260694 A1 * | 8/2019 | Londhe | .................. | G06N 20/00 |
| 2019/0340172 A1 * | 11/2019 | McElvain | ............... | G06N 5/041 |

OTHER PUBLICATIONS

Chinese Patent Application No. 201710773579.9, English translation of Office Action dated Dec. 31, 2019, 6 pages.

* cited by examiner

METHOD AND DEVICE FOR OBTAINING ANSWER, AND COMPUTER DEVICE

CROSS REFERENCE TO RELATED APPLICATION

This application is based on and claims a priority to Chinese Patent Application No. 201710773579.9, filed with the Status Intellectual Property Office of P. R. China on Aug. 31, 2017, the entire contents of which are incorporated herein by reference.

TECHNICAL FIELD

The present disclosure relates to the field of intelligent question and answer technology, and more particularly to a method and a device for obtaining an answer, and a computer device.

BACKGROUND

Enterprises think highly of labor costs, work efficiencies and customer experiences. Therefore, in recent years, most enterprises have or are considering introducing intelligent customer service or intelligent question and answer (Q&A) products for human-computer interaction in their websites, applications (APPs for short), business halls, etc., so as to help manual customer service to answer general-purpose questions, thereby replacing partial repetitive work of the customer service. Since it can help enterprises to significantly reduce labor costs, the demand for Q&A has always been a common demand in the course of business operation.

At present, intelligent Q&A has been widely used in various industries, especially in fields of finance, telecommunications, government affairs and e-commerce with large consulting volume.

Intelligent Q&A products in the related art have two functions, i.e., answer matching (a primary form) and dialogue understanding (an advanced form).

One, a primary form: answer matching

In this part, a semantic retrieval solution is used. In other words, Q&A resources are indexed first, and when the user asks questions, Q&A resources that are "approximate" to requirements of the user are "matched" out using semantic retrieval technologies, this path often cannot be combined with advanced dialogue management technologies.

Two, an advanced form: dialogue understanding

Through combination of natural language understanding (NLU) and dialogue management, language is understood as the form of "intention+word slot", and accurate answers are generated through subsequent technologies.

The technical solution of intelligent Q&A in the related art cannot achieve the combination of the above primary form and advanced form, and cannot allow the user to smoothly switch between the two forms, for this guidance path is not unique, but dynamically changed.

For example, users may want to ask "how to repay a cash loan with the mobile phone", there may be following situations in actual asking.

a) The user may first ask: I want to know about cash loan.

b) The user may also ask: I want to know about repayment.

c) The user may further ask: I want to know how to repay with the mobile phone.

In this way, when Q&A matching guidance technologies in the related art are used, multiple business logics (such as cash loan->mobile phone->repayment->obtaining the answer, mobile phone->cash loan->repayment->obtaining the answer, repayment->mobile phone->cash loan->obtaining the answer, etc.) with same goals may need to be configured.

However, when advanced dialogue understanding technologies are used, although dialogue logic configuration can be simplified by abstracting key information (such as "cash loan", "mobile phone" and "repayment") into word slots, users need to establish accurate intentions for respective questions (such as, how to repay the cash loan with the mobile phone, when will the cash loan be repaid, what is the handling fee for repaying the cash loan with the mobile phone). All the questions need to correspond to different intentions and accurate answers.

Dialogue understanding needs to build accurate intentions and word slots for respective answers, and provides a large amount of tagged data for training and learning, which is usually unaffordable for developers.

SUMMARY

Embodiments of a first aspect of the present disclosure provide a method for obtaining an answer. The method includes: receiving a question entered by a user; obtaining one or more first key information points in the question entered by the user according one or more preset word slots; asking the user about core question points through dialogue according to the one or more first key information points; obtaining answers entered by the user for the core question points; obtaining one or more second key information points in the answers entered by the user according to the one or more preset word slots; performing a retrieving in a Q&A library according to the one or more first key information points and the one or more second key information points to obtain an answer to the question entered by the user; and presenting the answer obtained to the user.

Embodiments of a second aspect of the present disclosure provide a computer device, including: a memory, a processor and computer programs stored in the memory and executable by the processor. When the processor executes the computer programs, the processor is configured to: receive a question entered by a user; obtain one or more first key information points in the question entered by the user according one or more preset word slots; ask the user about core question points through dialogue according to the one or more first key information points; obtain answers entered by the user for the core question points; obtain one or more second key information points in the answers entered by the user according to the one or more preset word slots; perform a retrieving in a question and answer Q&A library according to the one or more first key information points and the one or more second key information points to obtain an answer to the question entered by the user; and present the answer obtained to the user.

Embodiments of a third aspect of the present disclosure provide a non-transitory computer readable storage medium storing computer programs. When the computer programs are executed by a processor, the above method for obtaining an answer is performed.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
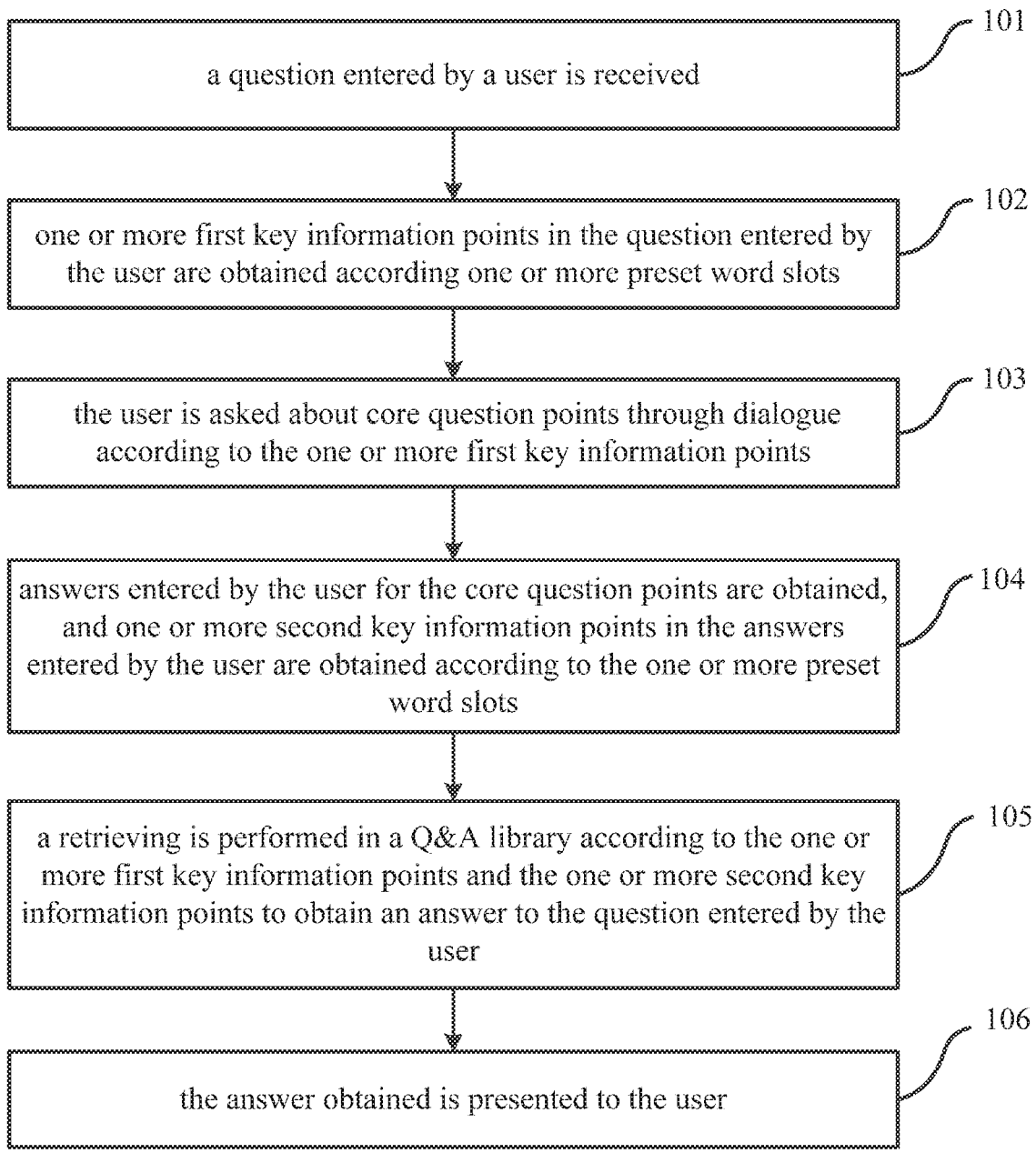
FIG. 1 is a flow chart of a method for obtaining an answer according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

FIG. 1 is a flow chart of a method for obtaining an answer according to an embodiment of the present disclosure. As illustrated in FIG. 1, the method may include followings.

At block 101, a question entered by a user is received.

In an embodiment, the user may enter the question through voice, text or picture, and embodiments of the present disclosure do not limit the manner in which the user enters the question.

At block 102, one or more first key information points in the question entered by the user are obtained according one or more preset word slots.

For example, it is assumed that the questions entered by the user is "I want to know about repayment of cash loan", and then one or more first key information points including key information points of "cash loan" and "repayment" may be obtained according to one or more preset word slots. In other words, the user can simultaneously express at least two key information points in the question entered.

At block 103, the user is asked about core question points through dialogue according to the one or more first key information points.

In an embodiment, after the one or more first key information points are obtained, the user may be asked about core question points (such as, "how to repay", "handling fee", and/or "when to repay", etc.) through dialogue according to the one or more first key information points.

At block 104, answers entered by the user for the core question points are obtained, and one or more second key information points in the answers entered by the user are obtained according to the one or more preset word slots.

In an embodiment, the user may enter the answers for the core question points by voice, text or picture, and embodiments of the present disclosure do not limit the manner in which the user enters the answers.

In detail, after the user is asked about the core question points, the answers entered by the user for the core question points can be obtained, and one or more second key information points (such as "using mobile phone" and "handling fee") in the answers entered by the user can be obtained according to the one or more preset word slots.

In an embodiment, obtaining the answers entered by the user for the core question points may include receiving the answers entered by the user in an arbitrary order for the core question points. The answer may include at least two key information points.

In other words, after the user is asked about the core question points through dialogue, the user may answer the core question points in arbitrary orders, and the user may also simultaneously express at least two key information points in the answers for the core question points.

At block 105, a retrieving is performed in a Q&A library according to the one or more first key information points and the one or more second key information points to obtain an answer to the question entered by the user.

At block 106, the answer obtained is presented to the user.

In the method for obtaining an answer according to embodiments of the present disclosure, after the question entered by the user is received, one or more first key information points in the question entered by the user are obtained according one or more preset word slots, and the user is asked about core question points through dialogue according to the one or more first key information points, answers entered by the user for the core question points are obtained, and one or more second key information points in the answers entered by the user are obtained according to the one or more preset word slots, a retrieving is performed in a Q&A library according to the one or more first key information points and the one or more second key information points to obtain an answer to the question entered by the user, and the answer obtained is presented to the user, such that combination of answer matching and dialogue understanding can be achieved, users can smoothly switch between the two forms, and it does not need to configure multiple business logics with same goals, the user can conveniently ask the same question from multiple paths, and it also does not need to establish accurate intentions for respective questions, which significantly reduces workload of developers.

Figure 2:
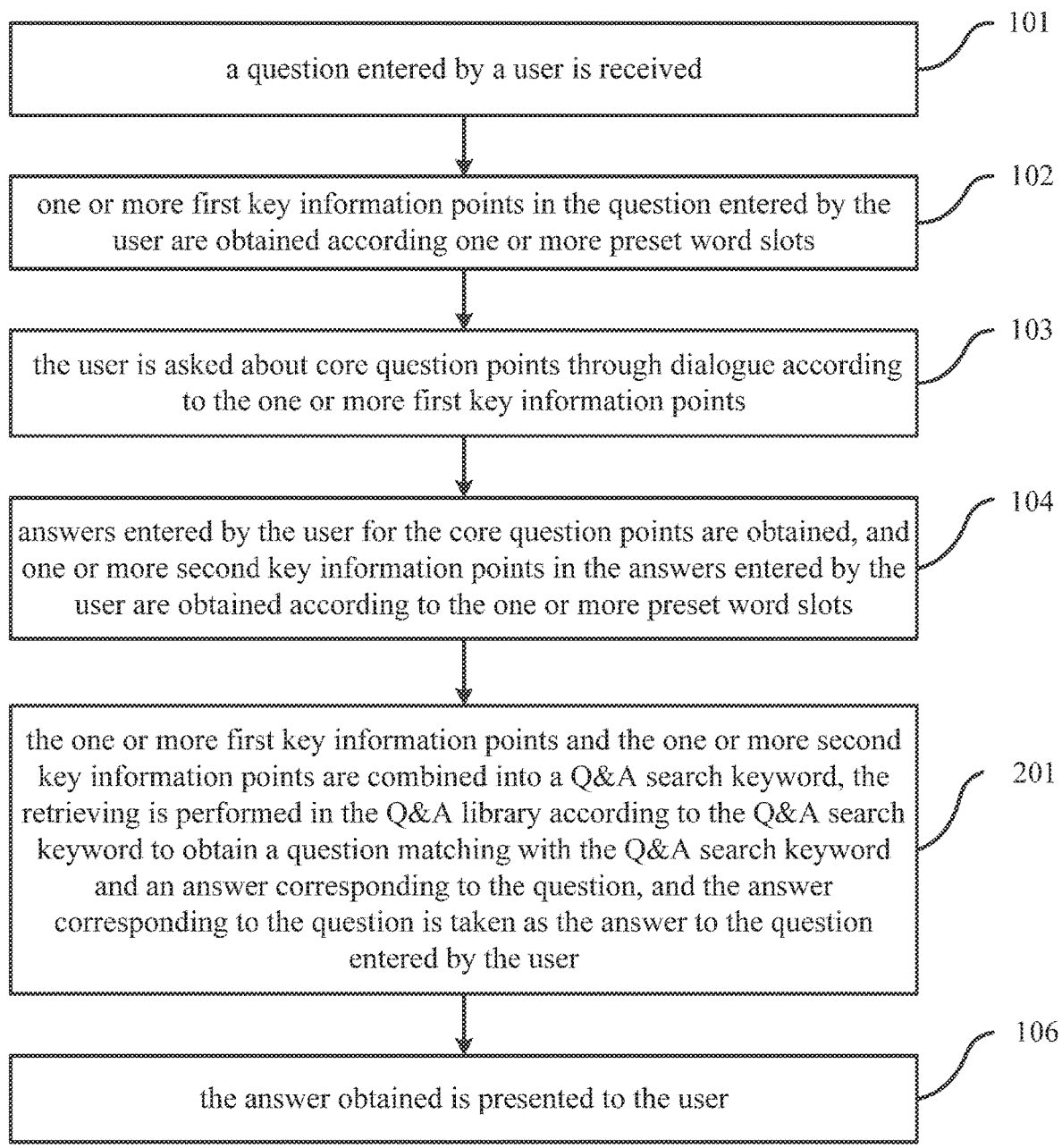
FIG. 2 is a flow chart of a method for obtaining an answer according to another embodiment of the present disclosure.

FIG. 2 is a flow chart of a method for obtaining an answer according to another embodiment of the present disclosure. As illustrated in FIG. 2, in embodiments illustrated in FIG. 1 of the present disclosure, block 105 may include followings.

At block 201, the one or more first key information points and the one or more second key information points are combined into a Q&A search keyword, the retrieving is performed in the Q&A library according to the Q&A search keyword to obtain a question matching with the Q&A search keyword and an answer corresponding to the question, and the answer corresponding to the question is taken as the answer to the question entered by the user.

In an embodiment, the one or more first key information points and the one or more second key information points collected in the dialogue process can be combined into the Q&A search keyword using the question generation technology, and the retrieving is performed in the Q&A library according to the Q&A search keyword to obtain the question matching with the Q&A search keyword and the answer corresponding to the question, and the answer corresponding to the question is taken as the answer to the question entered by the user, thus problems that dialogue understanding needs to configure precise intentions and word slots can be solved.

For example, the one or more first key information points collected in the dialogue process may include "cash loan" and "repayment", the one or more second key information points may include "using the mobile phone" and "handling fee", and then the one or more first key information points and the one or more second key information points can be combined into a Q&A search keyword such as "cash loan+repayment+mobile phone+handling fee" using the question generation technology.

Figure 3:
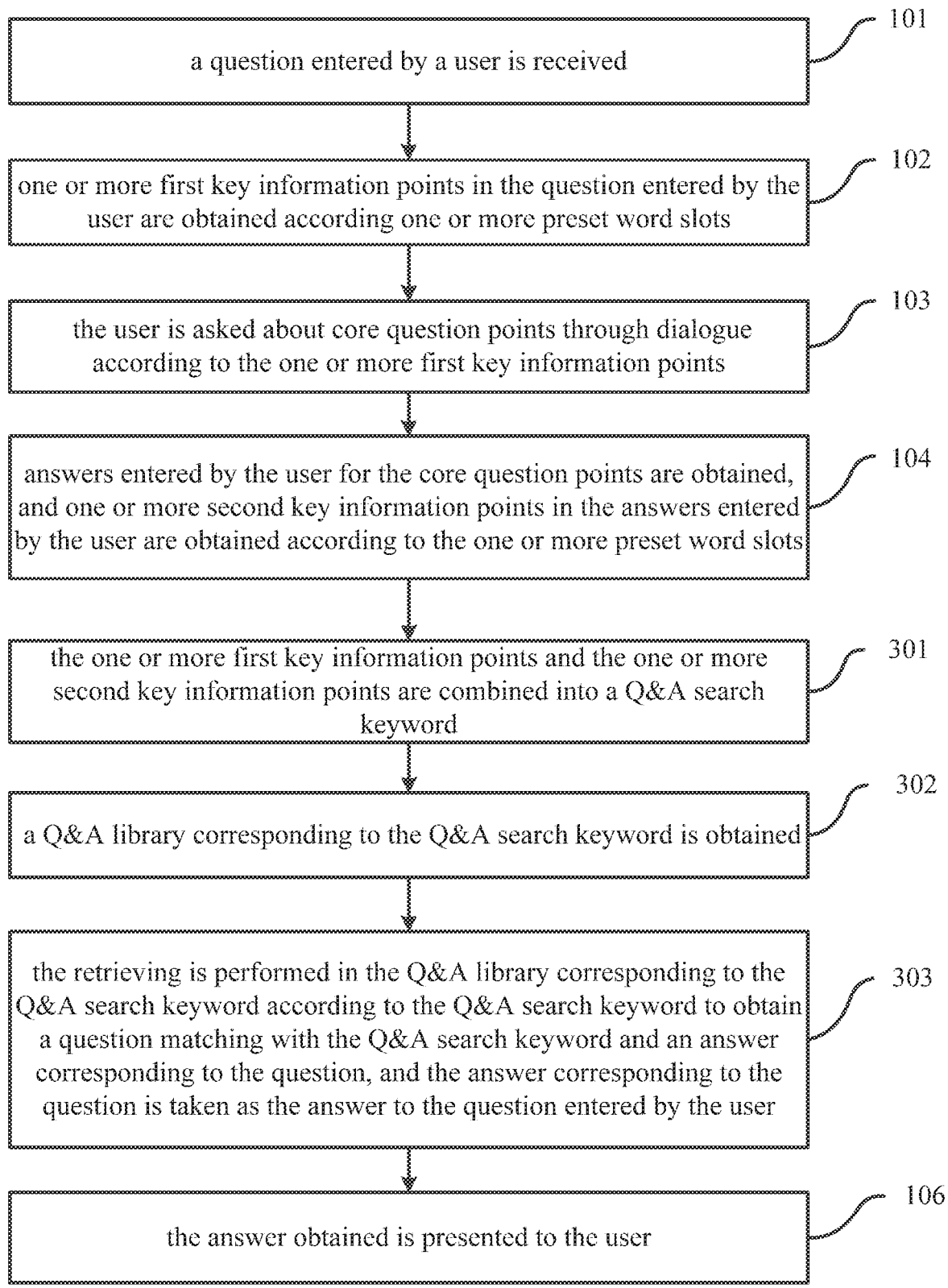
FIG. 3 a flow chart of a method for obtaining an answer according to yet another embodiment of the present disclosure.

FIG. 3 is a flow chart of a method for obtaining an answer according to yet another embodiment of the present disclosure. As illustrated in FIG. 3, in embodiments illustrated in FIG. 1 of the present disclosure, block 105 may include followings.

At block 301, the one or more first key information points and the one or more second key information points are combined into a Q&A search keyword.

In detail, the one or more first key information points and the one or more second key information points collected in the dialogue process can be combined into the Q&A search keyword using the question generation technology. For example, the one or more first key information points collected in the dialogue process may include "cash loan" and "repayment", the one or more second key information points may include "using the mobile phone" and "handling fee", and then the one or more first key information points and the one or more second key information points can be combined into a Q&A search keyword such as "cash loan+repayment+mobile phone+handling fee" using the question generation technology.

At block 302, a Q&A library corresponding to the Q&A search keyword is obtained.

In an embodiment, the Q&A library can be subdivided by layer-by-layer refinement. After the one or more first key information points and the one or more second key information points are combined into the Q&A search keyword, the Q&A library corresponding to the Q&A search keyword can be obtained through the rule, and Q&A library obtained is the Q&A library that is most suitable for matching the exact answer to the question entered by the user.

For example, it is assumed that the Q&A search keyword is "cash loan+repayment+mobile phone+handling fee", and then the Q&A library corresponding to the Q&A search keyword can be obtained as a cash loan Q&A library through the rule. It is further assumed that the Q&A search keyword is "cash loan for home improvement+repayment+mobile phone+handling fee", and then the Q&A library corresponding to the Q&A search keyword can be obtained as a home improvement loan Q&A library through the rule.

At block 303, the retrieving is performed in the Q&A library corresponding to the Q&A search keyword according to the Q&A search keyword to obtain a question matching with the Q&A search keyword and an answer corresponding to the question, and the answer corresponding to the question is taken as the answer to the question entered by the user.

In an embodiment, after the Q&A library corresponding to the Q&A search keyword is obtained, the retrieving may be performed in the Q&A library corresponding to the Q&A search keyword according to the Q&A search keyword to obtain the question matching with the Q&A search keyword and the answer corresponding to the question, and the answer corresponding to the question is taken as the answer to the question entered by the user, such that the user can be provided with more accurate Q&A experience.

Figure 4:
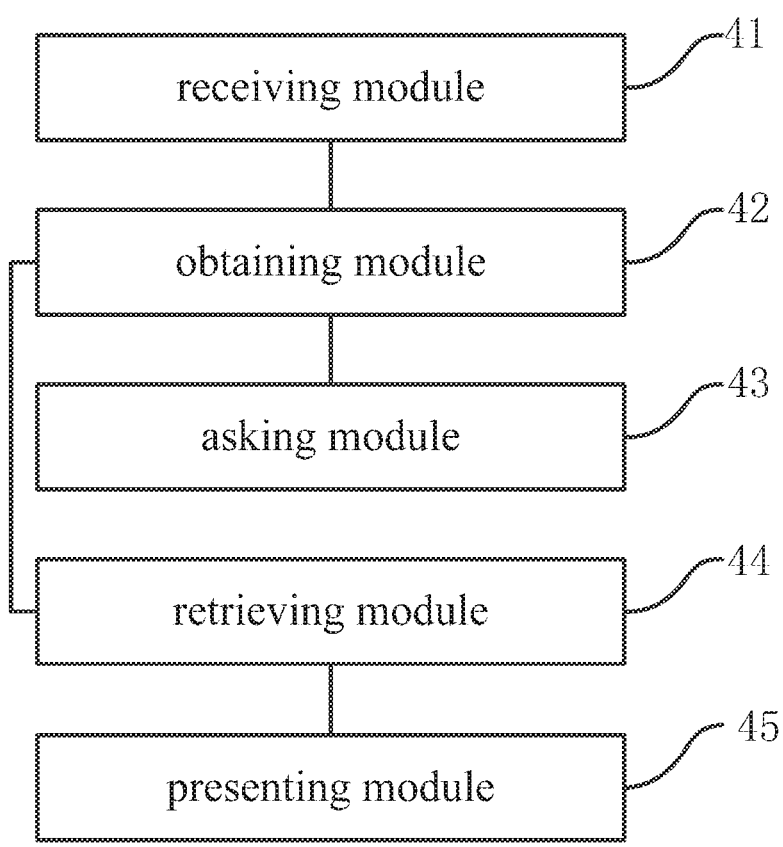
FIG. 4 is a block diagram of a device for obtaining an answer according to an embodiment of the present disclosure.

FIG. 4 is a block diagram of a device for obtaining an answer according to an embodiment of the present disclosure. The device for obtaining an answer provided by embodiments of the present disclosure can implement the method for obtaining an answer according to embodiments of the present disclosure. As illustrated in FIG. 4, the device for obtaining an answer includes a receiving module 41, an obtaining module 42, an asking module 43, a retrieving module 44 and a presenting module 45.

The receiving module 41 is configured to receive a question entered by a user. In an embodiment, the user may enter the question through voice, text or picture, and embodiments of the present disclosure do not limit the manner in which the user enters the question.

The obtaining module 42 is configured to obtain one or more first key information points in the question entered by the user according one or more preset word slots. For example, it is assumed that the questions entered by the user is "I want to know about repayment of cash loan", and then the obtaining module 42 may obtain one or more first key information points including key information points of "cash loan" and "repayment" according to one or more preset word slots. In other words, the user can simultaneously express at least two key information points in the question entered.

The asking module 43 is configured to ask the user about core question points through dialogue according to the one or more first key information points obtained by the obtaining module 42. In an embodiment, after the obtaining module 42 obtains the one or more first key information points, the asking module 43 may ask the user about core question points (such as, "how to repay", "handling fee", and/or "when to repay", etc.) through dialogue according to the one or more first key information points.

The obtaining module 42 is further configured to obtain answers entered by the user for the core question points, and obtain one or more second key information points in the answers entered by the user according to the one or more preset word slots. In an embodiment, the user may enter the answers for the core question points by voice, text or picture, and embodiments of the present disclosure do not limit the manner in which the user enters the answers.

In detail, after the asking module 43 asks the user about core question points, the obtaining module 42 can obtain the answers entered by the user for the core question points, and obtain one or more second key information points (such as "using mobile phone" and "handling fee") in the answers entered by the user according to the one or more preset word slots.

In an embodiment, the obtaining module 42 is configured to receive the answers entered by the user in an arbitrary order for the core question points. The answer may include at least two key information points.

In other words, after the asking module 43 asks the user about core question points through dialogue, the user may answer the core question points in arbitrary orders, and the user may also simultaneously express at least two key information points in the answers for the core question points.

The retrieving module 44 is configured to perform a retrieving in a Q&A library according to the one or more first key information points and the one or more second key information points obtained by the obtaining module 42, to obtain an answer to the question entered by the user.

The presenting module 45 is configured to present the answer obtained by the retrieving module 44 to the user.

In the device for obtaining an answer according to embodiments of the present disclosure, after the receiving module 41 receives the question entered by the user, the obtaining module 42 obtains one or more first key information points in the question entered by the user according one or more preset word slots, and the asking module 43 asks the user about core question points through dialogue according to the one or more first key information points, the obtaining module 42 obtains answers entered by the user for the core question points, and obtains one or more second key information points in the answers entered by the user according to the one or more preset word slots, and then the retrieving module 44 performs a retrieving in a Q&A library according to the one or more first key information points and the one or more second key information points to obtain an answer to the question entered by the user, the presenting module 45 presents the answer obtained to the user, such that combination of answer matching and dialogue understanding can be achieved, users can smoothly switch between the two forms, and it does not need to configure multiple business logics with same goals, the user can conveniently ask the same question from multiple paths, and it also does not need to establish accurate intentions for respective questions, which significantly reduces workload of developers.

Figure 5:
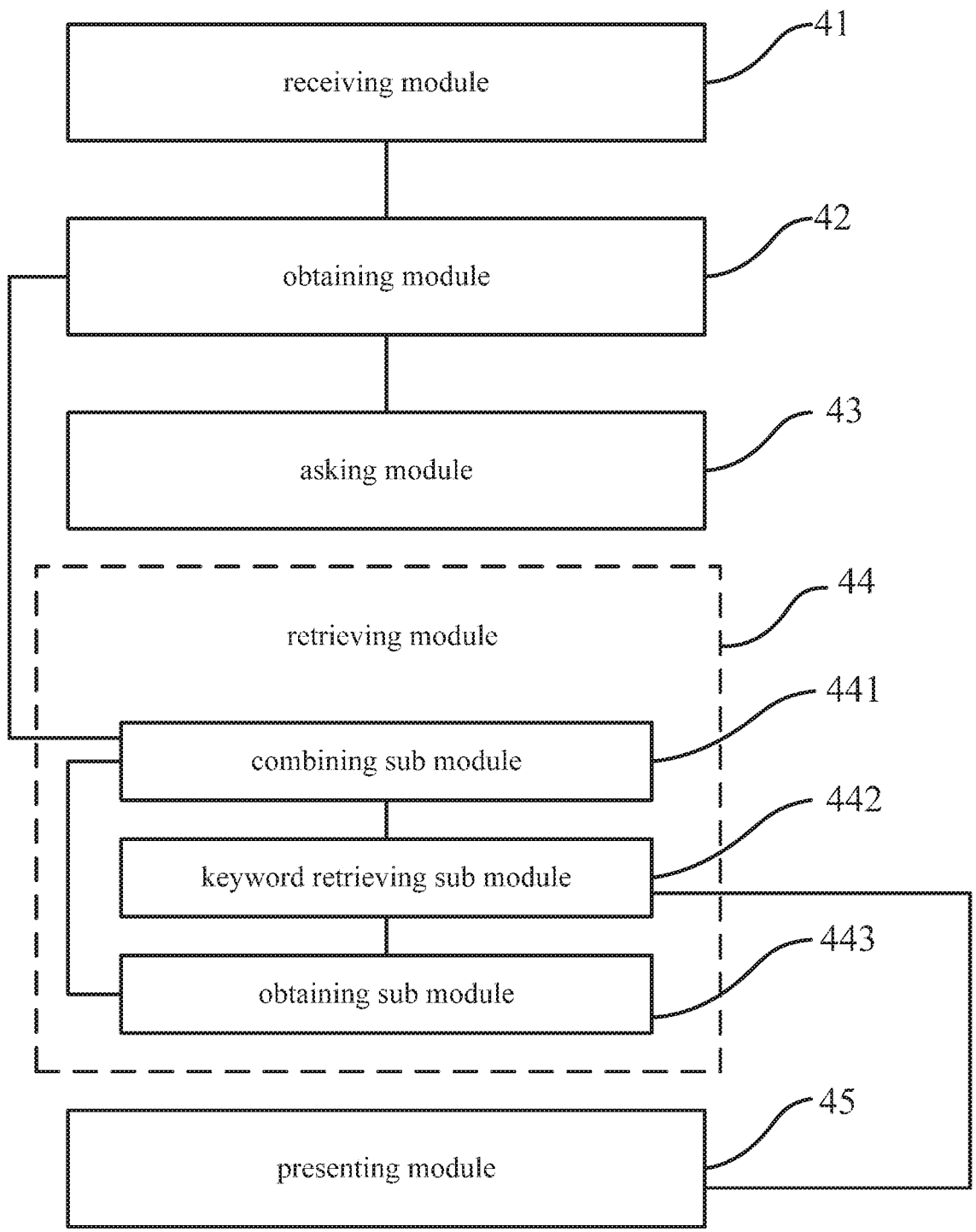
FIG. 5 is a block diagram of a device for obtaining an answer according to another embodiment of the present disclosure.

FIG. 5 is a block diagram of a device for obtaining an answer according to another embodiment of the present disclosure. Compared with the device for obtaining an answer illustrated in FIG. 4, in the device for obtaining an answer illustrated in FIG. 5, the retrieving module 44 may include a combining sub module 441 and a keyword retrieving sub module 442.

The combining sub module 441 is configured to combine the one or more first key information points and the one or more second key information points into a Q&A search keyword.

The keyword retrieving sub module 442 is configured to perform the retrieving in the Q&A library according to the Q&A search keyword combined by the combining sub module 441 to obtain a question matching with the Q&A search keyword and an answer corresponding to the question, and take the answer corresponding to the question as the answer to the question entered by the user.

In an embodiment, the combining sub module 441 may combine the one or more first key information points and the one or more second key information points collected in the dialogue process into the Q&A search keyword using the question generation technology, the keyword retrieving sub module 442 performs the retrieving in the Q&A library according to the Q&A search keyword to obtain the question matching with the Q&A search keyword and the answer corresponding to the question, and take the answer corresponding to the question as the answer to the question entered by the user, thus problems that dialogue understanding needs to configure precise intentions and word slots can be solved.

For example, the one or more first key information points collected in the dialogue process may include "cash loan" and "repayment", the one or more second key information points may include "using the mobile phone" and "handling fee", and then the keyword retrieving sub module 442 may combine the one or more first key information points and the one or more second key information points into a Q&A search keyword such as "cash loan+repayment+mobile phone+handling fee" using the question generation technology.

In another implementation of embodiments of the present disclosure, the retrieving module 44 may include a combining sub module 441, an obtaining sub module 443 and a keyword retrieving sub module 442.

The combining sub module 441 is configured to combine the one or more first key information points and the one or more second key information points into a Q&A search keyword.

In detail, the combining sub module 441 may combine the one or more first key information points and the one or more second key information points collected in the dialogue process into the Q&A search keyword using the question generation technology. For example, the one or more first key information points collected in the dialogue process may include "cash loan" and "repayment", the one or more second key information points may include "using the mobile phone" and "handling fee", and then the keyword retrieving sub module 442 may combine the one or more first key information points and the one or more second key information points into a Q&A search keyword such as "cash loan+repayment+mobile phone+handling fee" using the question generation technology.

The obtaining sub module 443 is configured to obtain a Q&A library corresponding to the Q&A search keyword.

In an embodiment, the Q&A library can be subdivided by layer-by-layer refinement. After the combining sub module 441 combines the one or more first key information points and the one or more second key information points into the Q&A search keyword, the obtaining sub module 443 can obtain the Q&A library corresponding to the Q&A search keyword through the rule, and Q&A library obtained is the Q&A library that is most suitable for matching the exact answer to the question entered by the user.

For example, it is assumed that the Q&A search keyword is "cash loan+repayment+mobile phone+handling fee", and then the obtaining sub module 443 may obtain the Q&A library corresponding to the Q&A search keyword as a cash loan Q&A library through the rule. It is further assumed that the Q&A search keyword is "cash loan for home improvement+repayment+mobile phone+handling fee", and then the obtaining sub module 443 may obtain the Q&A library corresponding to the Q&A search keyword as a home improvement loan Q&A library through the rule.

The keyword retrieving sub module 442 is configured to perform the retrieving in the Q&A library corresponding to the Q&A search keyword according to the Q&A search keyword combined by the combining sub module 441 to obtain a question matching with the Q&A search keyword and an answer corresponding to the question, and take the answer corresponding to the question as the answer to the question entered by the user.

In an embodiment, after the obtaining sub module 443 obtains the Q&A library corresponding to the Q&A search keyword, the keyword retrieving sub module 442 may perform the retrieving in the Q&A library corresponding to the Q&A search keyword according to the Q&A search keyword to obtain the question matching with the Q&A search keyword and the answer corresponding to the question, and the answer corresponding to the question is taken as the answer to the question entered by the user, such that the user can be provided with more accurate Q&A experience.

Figure 6:
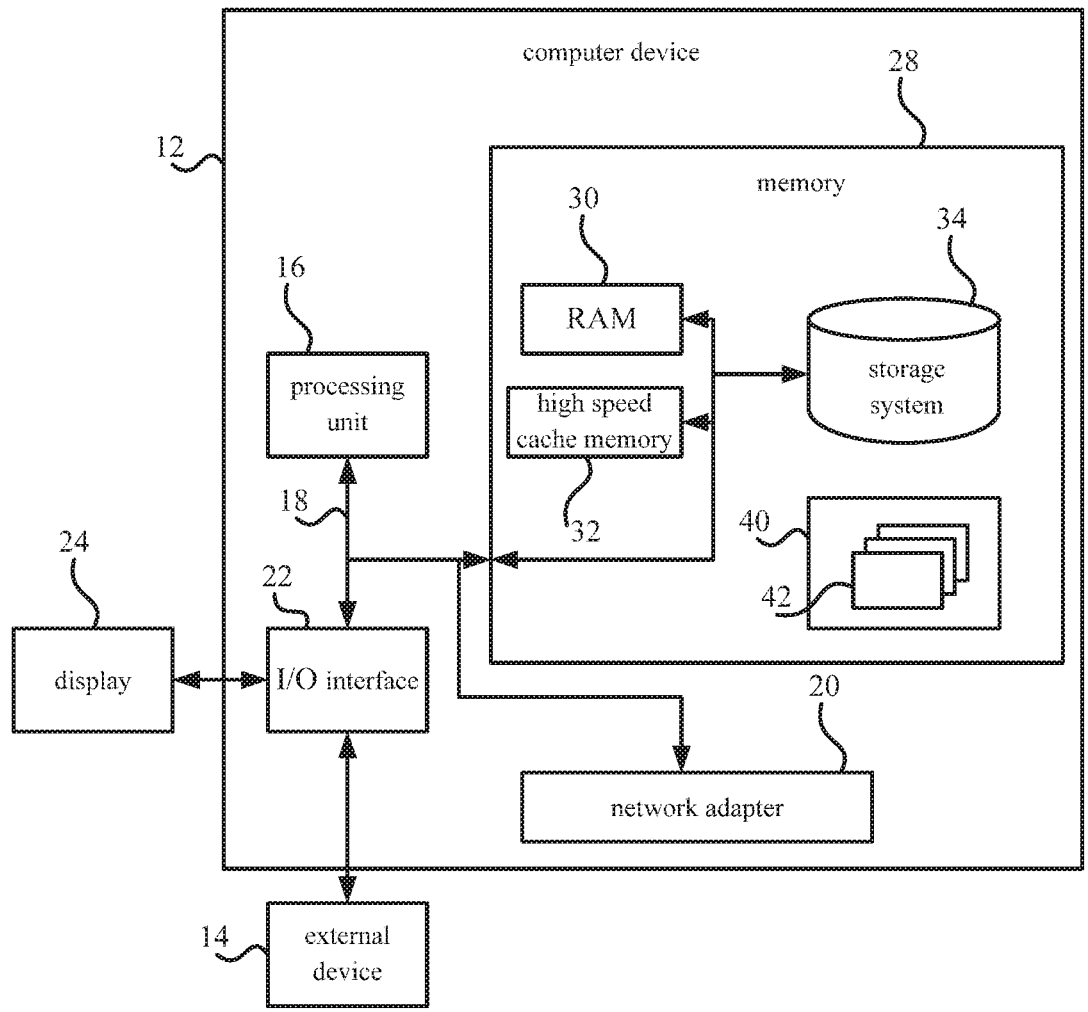
FIG. 6 is a schematic diagram of a computer device according to an embodiment of the present disclosure.

FIG. 6 is a schematic diagram of a computer device according to an embodiment of the present disclosure. The computer device may include a memory, a processor and computer programs stored in the memory and executable by the processor. When the processor executes the computer programs, the method for obtaining an answer according to embodiments of the present disclosure is performed.

The above-mentioned computer device may be a server or a terminal device, and the terminal device may be a smart terminal device such as a smart phone, a tablet computer, a notebook computer or a smart watch, which is not limited in embodiments of the present disclosure.

FIG. 6 is a block diagram of an exemplary computer device 12 suitable for realizing implementations of the present disclosure. The computer device 12 illustrated in FIG. 6 is merely an example, and should be not understood as a limitation on the functions and usage scope of embodiments of the present disclosure.

As illustrated in FIG. 6, the computer device 12 may be represented in a form of a general-purpose computing device. Components of the computer device 12 may include but are not limited to one or more processors or processing units 16, a system memory 28, a bus 18 connecting various system components including the system memory 28 and the processing units 16.

The bus 18 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12, including volatile and non-volatile media, removable and non-removable media.

The system memory 28 may include a computer system readable medium in the form of volatile memory, such as a random access memory (hereinafter referred to as RAM) 30 and/or a high speed cache memory 32. The computer device 12 may further include other removable or non-removable, volatile or non-volatile computer system storage medium. By way of example only, the storage system 34 may be configured to read and write non-removable and non-volatile magnetic media (not shown in FIG. 6, commonly referred to as a "hard drive"). Although not shown in FIG. 6, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), a digital video disc read only memory (hereinafter referred to as DVD-ROM) or other optical media can be provided. In these cases, each driver may be connected to the bus 18 via one or more data medium interfaces. The memory 28 may include at least one program product. The program product has a set of (such as, at least one) program modules configured to perform the functions of various embodiments of the present disclosure.

A program/utility 40 having a set of (at least one) the program modules 42 may be stored in, for example, the memory 28. The program modules 42 include but are not limited to, an operating system, one or more application programs, other programs modules and program data. Each of these examples, or some combination thereof, may include an implementation of a network environment. The program modules 42 generally configured to perform functions and/or methods in embodiments of the present disclosure.

The computer device 12 may also communicate with one or more external devices 14 (such as, a keyboard, a pointing device, a display 24, etc.). Furthermore, the computer device 12 may also communicate with one or more devices enabling a user to interact with the computer device 12 and/or other devices (such as a network card, a modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as the Internet) through a network adapter 20. As shown in FIG. 6, the network adapter 20 communicates with other modules of the computer device 12 over the bus 18. It should be understood that, although not shown in FIG. 6, other hardware and/or software modules may be used in conjunction with the computer device 12, which include, but are not limited to, microcode, device drivers, redundant processing units, external disk drive arrays, RAID systems, tape drives, as well as data backup storage systems and the like.

The processing unit 16 is configured to execute various functional applications and data processing by running programs stored in the system memory 28, for example, to implement the method for obtaining an answer provided in embodiments of the present disclosure.

Embodiments of the present disclosure further provide a non-transitory computer readable storage medium, configured to store computer programs. When the computer programs are executed by a processor, the method for obtaining an answer according to embodiments of the present disclosure is performed.

The above non-transitory computer readable storage medium may adopt any combination of one or more computer readable medium(s). The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by or in connection with an instruction executed system, apparatus or device.

The computer readable signal medium may include a data signal propagating in baseband or as part of carrier wave, which carries computer readable program codes. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport programs used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not construed as indicating or implying relative importance or significance. Furthermore, in the description of the present disclosure, unless specified otherwise, "a plurality of" means two or more than two.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for obtaining an answer, comprising:
receiving by a question and answer (Q&A) device for human-computer interaction, a question entered by a user;
obtaining by the Q&A device, one or more first key information points in the question entered by the user according one or more preset word slots;
asking by the Q&A device, the user about core question points through dialogue, in which the core question points are determined according to the one or more first key information points;
obtaining by the Q&A device, answers entered by the user for the core question points;
obtaining by the Q&A device, one or more second key information points in the answers entered by the user according to the one or more preset word slots;

combining by the Q&A device, the one or more first key information points and the one or more second key information points into a Q&A search keyword;

retrieving by the Q&A device, a question matching with the Q&A search keyword and an answer corresponding to the question in a Q&A library;

taking by the Q&A device, the answer corresponding to the question as the answer to the question entered by the user; and presenting by the Q&A device, the answer obtained to the user.

2. The method according to claim 1, wherein retrieving by the Q&A device, the Q&A library according to the Q&A search keyword further comprises:

dividing by the Q&A device, the Q&A library into a plurality of Q&A sub-libraries by layer-by-layer refinement;

obtaining by the Q&A device, a Q&A sub-library corresponding to the Q&A search keyword from the plurality of Q&A sub-libraries; and retrieving by the Q&A device, the Q&A sub-library according to the Q&A search keyword.

3. The method according to claim 1, wherein obtaining by the Q&A device, the answers entered by the user for the core question points comprises:

receiving by the Q&A device, the answers entered by the user in an arbitrary order for the core question points, the answers comprising at least two key information points.

4. The method according to claim 2, wherein obtaining by the Q&A device, the answers entered by the user for the core question points comprises:

receiving by the Q&A device, the answers entered by the user in an arbitrary order for the core question points, the answers comprising at least two key information points.

5. A computer device, comprising:

a memory;

a processor; and computer programs stored in the memory and executable by the processor, wherein the processor is configured to execute the computer programs, so as to:

receive a question entered by a user;

obtain one or more first key information points in the question entered by the user according one or more preset word slots;

ask the user about core question points through dialogue, in which the core question points are determined according to the one or more first key information points;

obtain answers entered by the user for the core question points;

obtain one or more second key information points in the answers entered by the user according to the one or more preset word slots;

combine the one or more first key information points and the one or more second key information points into a question and answer Q&A search keyword;

retrieving by the Q&A device, a question matching with the Q&A search keyword and an answer corresponding to the question in a Q&A library;

take the answer corresponding to the question as the answer to the question entered by the user; and present the answer obtained to the user.

6. The computer device according to claim 5, wherein when the processor is configured to retrieve the Q&A library according to the Q&A search keyword the processor is configured to:

divide the Q&A library into a plurality of Q&A sub-libraries by layer-by-layer refinement;

obtain a Q&A sub-library corresponding to the Q&A search keyword from the plurality of Q&A sub-libraries; and retrieve the Q&A sub-library according to the Q&A search keyword.

7. The computer device according to claim 5, wherein when the processor is configured to obtain the answers entered by the user for the core question points, the processor is configured to:

receive the answers entered by the user in an arbitrary order for the core question points, the answers comprising at least two key information points.

8. The computer device according to claim 6, when the processor is configured to obtain the answers entered by the user for the core question points, the processor is configured to:

receive the answers entered by the user in an arbitrary order for the core question points, the answers comprising at least two key information points.

9. A non-transitory computer readable storage medium configured to storing computer programs, wherein when the computer programs are executed by a processor, a method for obtaining an answer is performed, the method comprises:

receiving a question entered by a user;

obtaining one or more first key information points in the question entered by the user according one or more preset word slots;

asking the user about core question points through dialogue, in which the core question points are determined according to the one or more first key information points;

obtaining answers entered by the user for the core question points;

obtaining one or more second key information points in the answers entered by the user according to the one or more preset word slots;

combining the one or more first key information points and the one or more second key information points into a question and answer Q&A search keyword;

retrieving by the Q&A device, a question matching with the Q&A search keyword and an answer corresponding to the question in a Q&A library;

taking the answer corresponding to the question as the answer to the question entered by the user; and presenting the answer obtained to the user.

10. The non-transitory computer readable storage medium according to claim 9, wherein retrieving the Q&A library according to the Q&A search keyword further comprises:

dividing the Q&A library into a plurality of Q&A sub-libraries by layer-by-layer refinement;

obtaining a Q&A sub-library corresponding to the Q&A search keyword from the plurality of Q&A sub-libraries; and retrieving the Q&A sub-library according to the Q&A search keyword.

11. The non-transitory computer readable storage medium according to claim 9, wherein obtaining the answers entered by the user for the core question points comprises:

receiving the answers entered by the user in an arbitrary order for the core question points, the answers comprising at least two key information points.

12. The non-transitory computer readable storage medium according to claim 10, wherein obtaining the answers entered by the user for the core question points comprises:
    receiving the answers entered by the user in an arbitrary order for the core question points, the answers comprising at least two key information points.

\* \* \* \* \*